G. C. JACOBSON & C. OLSON.
CYLINDER TOOTH.
APPLICATION FILED APR. 10, 1908.
918,857.
Patented Apr. 20, 1909.
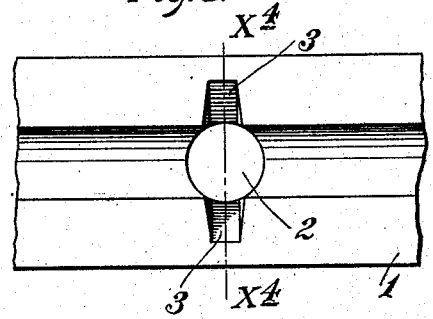
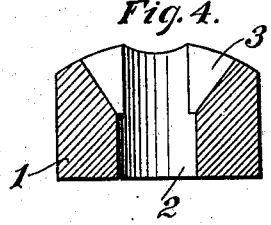
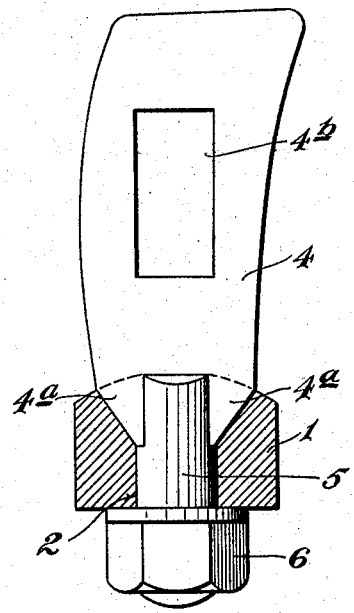
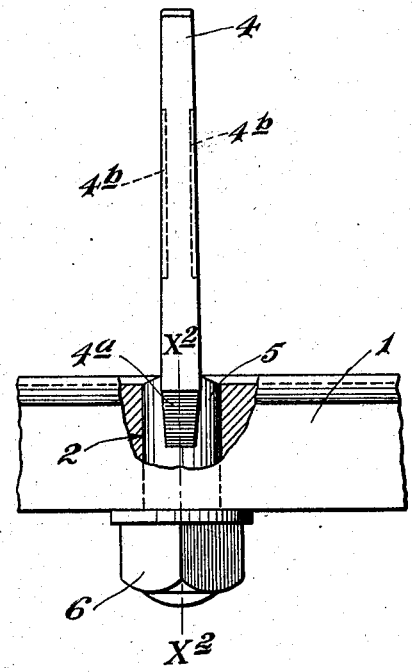
Witnesses:
W. H. Souba.
Harry Opsahl.
Inventors:
George C. Jacobson.
Carl Olson.
By their Attorneys:
Williamson & Merchant

UNITED STATES PATENT OFFICE.

GEORGE C. JACOBSON, OF LISBON, AND CARL OLSON, OF McLEOD, NORTH DAKOTA.

CYLINDER-TOOTH.

No. 918,857.     Specification of Letters Patent.     Patented April 20, 1909.

Application filed April 10, 1908. Serial No. 426,243.

*To all whom it may concern:*

Be it known that we, GEORGE C. JACOBSON and CARL OLSON, citizens of the United States, residing, respectively, at Lisbon and McLeod, in the county of Ransom and State of North Dakota, have invented certain new and useful Improvements in Cylinder-Teeth; and we do hereby declare the following to be a full, clear, and exact description of the invention, such as will enable others skilled in the art to which it appertains to make and use the same.

Our invention has for its object to improve the construction of threshing cylinder and concave teeth for threshing machines, and to this end it consists of the novel construction and combination of parts hereinafter described and defined in the claim.

The invention is illustrated in the accompanying drawings, wherein like characters indicate like parts throughout the several views.

Referring to the drawings, Figure 1 is a view in front elevation, showing a cylinder or concave tooth and a portion of the bar to which it is secured, some parts being broken away. Fig. 2 is a view partly in side elevation and partly in section on the line $x^2\ x^2$ of Fig. 1. Fig. 3 is a plan view showing a portion of the bar, and particularly illustrating the construction of the seat therein for the tooth; and Fig. 4 is a section taken on the line $x^4\ x^4$ of Fig. 3.

The numeral 1 indicates a bar, which may be assumed to be either one of the cylinder bars or concave bars. This bar, of course, will have a multiplicity of toothed seats, but in the drawings only one thereof is shown, for the reason that the general arrangement of threshing cylinders and concaves are well understood. The seat for the tooth has a cylindrical perforation 2 and on its face is provided with diametrically opposite blade seats 3, which blade seats taper downward or inward, both in transverse and longitudinal directions.

The cylinder or concave tooth comprises a blade 4 and a cylinder stem 5 integrally formed therewith, and threaded at its end for engagement with a nut 6. The stem 5 closely fits the perforation 2 of the bar 1, and the base or inner extremity $4^a$ of the blade 4 is beveled at both edges and both sides so that it closely fits the beveled seats 3 of the bar 1.

When the blade is applied to the bar as shown, and the nut 6 is tightened, the beveled shank end of the blade is tightly drawn into the beveled seat of the bar and is very securely seated in the bar, so that breaking of the blade at the point of junction with its stem 5 is effectually prevented and the blade can not possibly become loose, even under the roughest usage.

The blade 4, in its opposite faces or sides, is provided with depressions or shallow pockets $4^b$, which not only reduce the material of the blade, but provide the same with additional striking shoulders for action on the straw of the grain being threshed.

The entire tooth is adapted to be drop forged or stamped into form and should be made of steel.

What we claim is:

In a device of the kind described, the combination with a bar 1 having a cylindrical perforation 2 and diametrically opposite blade seats 3 that are beveled in both directions, of a tooth comprising a blade 4 having an integrally formed stem 5 threaded for engagement with a nut and having a threadless cylindrical portion closely fitting said perforation, the inner end of said blade having diametrically projecting portions $4^a$ that overlap the end of the said stem and are beveled in both directions to fit the seats 3 of the bar, which bar completely covers the projecting portions $4^a$ and the overlapped portion of the stem, substantially as described.

In testimony whereof we affix our signatures in presence of two witnesses.

GEORGE C. JACOBSON.
      CARL OLSON.

Witnesses:
  CHAS. S. EGO,
  MARTIN JONES.